US006243452B1

(12) United States Patent
O'Shaughnessey et al.

(10) Patent No.: US 6,243,452 B1
(45) Date of Patent: *Jun. 5, 2001

(54) GRAPHICAL CALL STATUS PRESENTATION SYSTEM

(75) Inventors: Patrick Michael O'Shaughnessey, New York, NY (US); Robert Donald Monroe, Jr., Cary, NC (US)

(73) Assignee: Nortel Networks Limited, Montreal (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/065,117

(22) Filed: Apr. 23, 1998

(51) Int. Cl.[7] .......................... H04M 3/42; H04M 11/00; G06F 3/00; G06F 13/00
(52) U.S. Cl. .......................... 379/201; 345/334; 345/335; 345/349; 379/93.17; 379/207
(58) Field of Search ..................... 345/333, 334, 345/335, 339, 348, 349, 967; 379/93.17, 93.23, 201, 207, 260, 265, 308, 309

(56) References Cited

U.S. PATENT DOCUMENTS 5,533,110 7/1996 Pinard et al. .................. 379/201
5,621,789 * 4/1997 McClamont et al. .......... 379/93.17 X
5,627,978 * 5/1997 Altom et al. .................. 345/349 X
5,754,636 * 5/1998 Bayless et al. ................ 379/201 X
5,831,611 * 11/1998 Kennedy et al. .............. 345/335
5,940,488 * 8/1999 DeGrazia et al. ............. 379/93.23 X
5,943,055 * 8/1999 Sylvan .......................... 379/201 X

OTHER PUBLICATIONS

SoftTalk Inc., "Phonetastic; A New Dimension In Workgroup Productivity", brochure, Oct. 11, 1994.*

Research Disclosure, May 1993 pp 302; 34936 Using Distribution Test to Initiate Teleconferences.

* cited by examiner

Primary Examiner—Harry S. Hong (57) ABSTRACT

A graphical call status presentation system. A computer implemented method indicates the status of a communication session using graphical user interface elements. The graphical user interface elements are displayed on a toolbar which can be part of a desktop application or the computer operating system. A state persistence agent in conjunction with application-specific macros controls the graphical user interface elements. The system keeps a user informed of the status of various components of a communication session and also prevents the user from trying to activate functions which cannot be used.

30 Claims, 7 Drawing Sheets

GRAPHICAL CALL STATUS PRESENTATION SYSTEM

BACKGROUND

1. Field of the Invention

This invention is related to the field of computer graphical user interfaces and to the field of telecommunications. More specifically, this invention is related to the use of a computer graphical user interface to report the status of a telecommunication session to a user.

2. Description of the Problem Solved

Historically, voice telecommunications and data telecommunications have been largely separate to most computer users. Recently, however, telecommunication systems which have components of voice communication and computer or data communication integrated together have begun to proliferate. For example, many computer users are making use of data communication systems which include voice capability where the voice communication path is terminated by the user's personal computer. Such a system makes use of some type of voice data conversion, such as voice-over-Internet-protocol. Yet another type of system is disclosed in U.S. patent application No. 09/065,124, filed Apr. 23, 1998, entitled, "Integrated Telecommunication Collaboration System," which is assigned to the assignee the of the present application and incorporated herein by reference. This system provides for integration between data communication and high-quality PSTN voice communication.

While current systems are extremely useful, they suffer from basic deficiencies in the way that they present information to the computer user via the user interface. Many telecommunication systems provide a separate, dedicated application which displays the status of a particular telecommunication activity, such as a conference call. One such system is described in U.S. Pat. No. 5,533,110 to Pinard et al., which is incorporated herein by reference. The system described in Pinard graphically displays various aspects of the status of certain types of telecommunication calls. However, it displays the status within a separate application; there is no integration with either a computer operating system interface or with general purpose desktop applications such as word processors and spread sheets. Also, the current systems provide no way to monitor the status of a PSTN telephone connection which may be used in implementing the telecommunication session.

Products such as NetMeeting™ by Microsoft provide toolbar buttons which can be activated from either within applications or from an operating system interface such as the taskbar application tray. However, the buttons provided by these products don't provide an accurate indication of the status of the telecommunication session. While they may be used to activate various functions, they do not change state in accordance with the status of various activities which form part of the telecommunications session. In fact, such systems often lead a user to believe he or she can activate a function which in fact cannot be activated because it is already in use, or the state of the system does not allow for its use.

What is needed is a computer graphical user interface which not only allows a user to activate various telecommunication session functions, but also dynamically indicates the status of various calls and activities within a telecommunication session. Such an interface should be able to be integrated with common desktop applications, or with the operating system interface. Such a system would not only keep a user informed of the status of a telecommunication session, but also would prevent the user from trying to activate functions which cannot be used at the present time.

SUMMARY

The present invention meets the above needs by providing a computer system graphical user interface which presents accurate voice and data call status to a user. The graphical user interface elements of the present invention can be integrated into the toolbar of desktop applications, and/or into the system application tray of a personal computer operating system. The interface of the present invention presents a status of a communication session which includes data and voice call components. In addition, the interface of the present invention can indicate the status of a PSTN telephone which is associated with the communication session. Status includes such things as whether a user's phone is on-hook, off-hook, on hold, ringing, or in a call. The status also includes data related information such as whether the user is in the data call, and whether in application is currently being shared via a collaborative telecommunication system.

The present invention is realized through a computer implemented method of dynamically indicating a status of the communication session using graphical user interface elements. The graphical presentation system tracks changes in the status of the communication session. In the case where the graphical user interface elements are integrated with the desktop application, an application-specific macro registers these elements with the application. A state persistence agent changes the state of one or more of the application-integrated graphical user interface elements in accordance with a change in status of the communication session. In the case where the graphical user interface elements are displayed in an operating system interface, the state persistence agent likewise changes the state of one or more operating system graphical user interface elements in accordance with a change in status of the communication session.

The software system which implements the graphical presentation interface of the present invention includes a communications agent which monitors and synchronizes data and voice elements of a communication session, application-specific macros which are invoked in response to user actions on application-integrated graphical user interface elements, an integration agent which processes user requests and monitors the communications agent, and the state persistence agent which processes requests to update graphical user interface elements.

The software which implements many aspects of the present invention can be stored on a media. The media can be magnetic such as diskette, tape or fixed disk, or optical such as a CD-ROM. Additionally, the software can be supplied via the Internet or some type of private data network. A workstation which typically runs the client software includes a plurality of input/output devices, a connection for a network, and a system unit which includes the hardware and software necessary to run the graphical call status presentation system.

DETAILED DESCRIPTION OF THE PREFERRED EMBODIMENT

Figure 1:
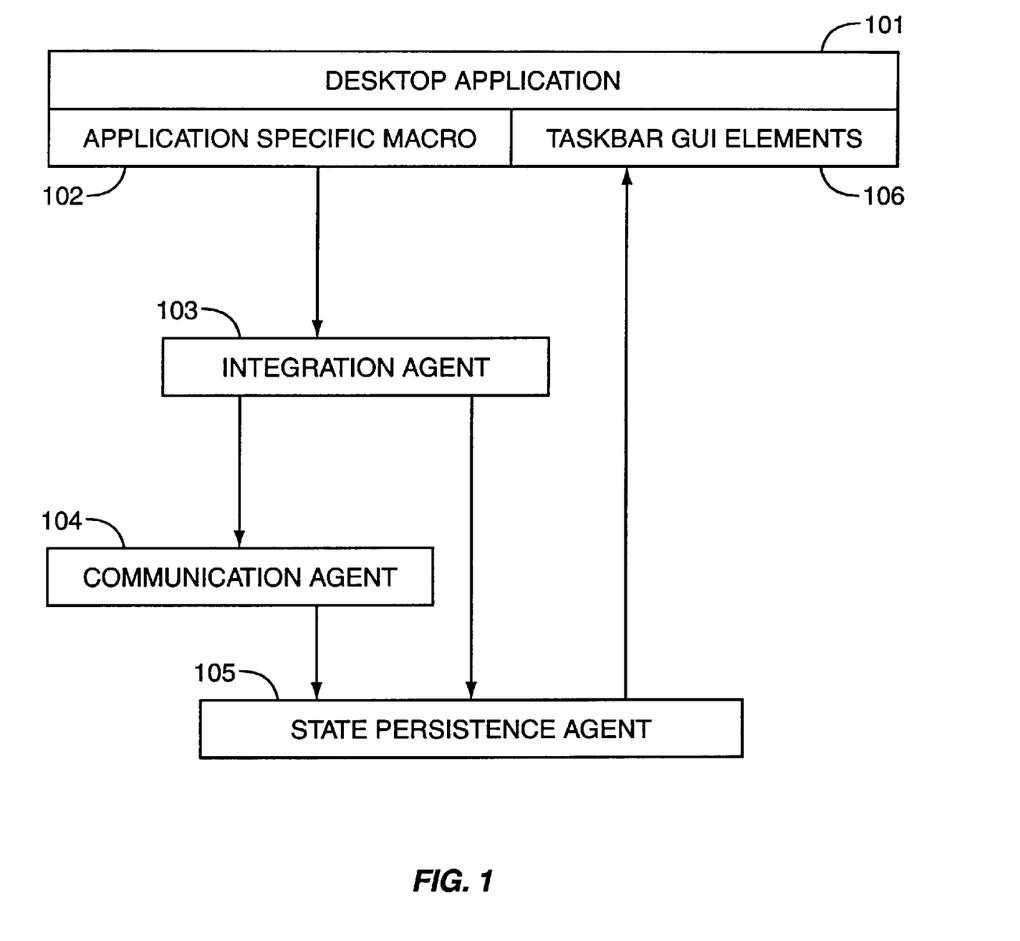
FIG. 1 is a block diagram illustrating the various software components involved in implementing the present invention.

The present invention allows a set of computer graphical user interface (GUI) elements to be embedded within a number of applications on the user's desktop, or within a taskbar which is part of the computer operating system. These GUI elements are updated appropriately when a user's communication session status changes. FIG. 1 illustrates the key software components involved in implementing the present invention in the preferred embodiment. For purposes of this discussion, we assume that the operating environment of the present invention is similar to that of the Integrated Telecommunication Collaboration System (ITCS) described in the incorporated application. The arrows in FIG. 1 indicate visibility of the software components to other software components. That is, a component is visible to any other components that are pointing to it.

State persistence agent 105 in FIG. 1 is a running executable that is able to receive requests from the other software components and update toolbar buttons so that they reflect the state of the communication session. Communication agent 104 is responsible for synchronizing the various agents which are directly responsible for the various components of a communication session. In the preferred embodiment these are a data agent and the voice agent which are not shown for simplicity. In the preferred embodiment, communication agent 104 makes available an interprocess compliant interface allowing other applications to make communication requests such as place a call, release a call, share an application, collaborate on an application, etc. Integration agent 103 is the component responsible for integrating communication capability directly into a specific set of computer desktop applications as well as into an operating system interface. Integration agent 103 processes user input and makes the appropriate communication requests of the communication agent 104.

For each application, an application specific macro 102 is run when the application starts. This application-specific macro uses the integration agent to register the application and each of its buttons with the state persistence agent. The application-specific macros are triggered when the user interacts with the embedded toolbar buttons. The application-specific macros make use of the integration agent to perform actions requested by the user. The integration agent 103 then makes requests of the communication agent to initiate calls, share applications, etc.. It is also possible to have computer GUI elements integrated into the operating system interface. In the preferred embodiment, as shown in FIG. 1, taskbar GUI elements 106 are present in system application tray. State persistence agent 105 controls these GUI elements directly.

The graphical user interface of the present invention is used to control a communication session which can include a voice call and a data call which are associated with each other and are together referred to as a "harmonized" call. In the preferred embodiment the data call is implemented by a data agent which implements a multimedia data communication protocol such as that described in the International Telecommunication Union (ITU) standard H.323. The voice call is implemented by a voice agent which preferably makes use of the public switched telephone network (PSTN) in order to provide high-quality voice communications. The data agent communicates the current status of the user's data connection to the state persistence agent 105 through the communication agent 104. The voice agent communicates the current status of user's voice capability to the state persistence agent 105 through the communication agent 104. The voice agent may receive this information from a third party PSTN call entity such as a computer telephony integration server (CTServer). The voice agent may also receive this information from a first party PSTN call entity such as a tethered device, that is, a telephone device which is connected directly with the user's personal computer.

Figure 5:
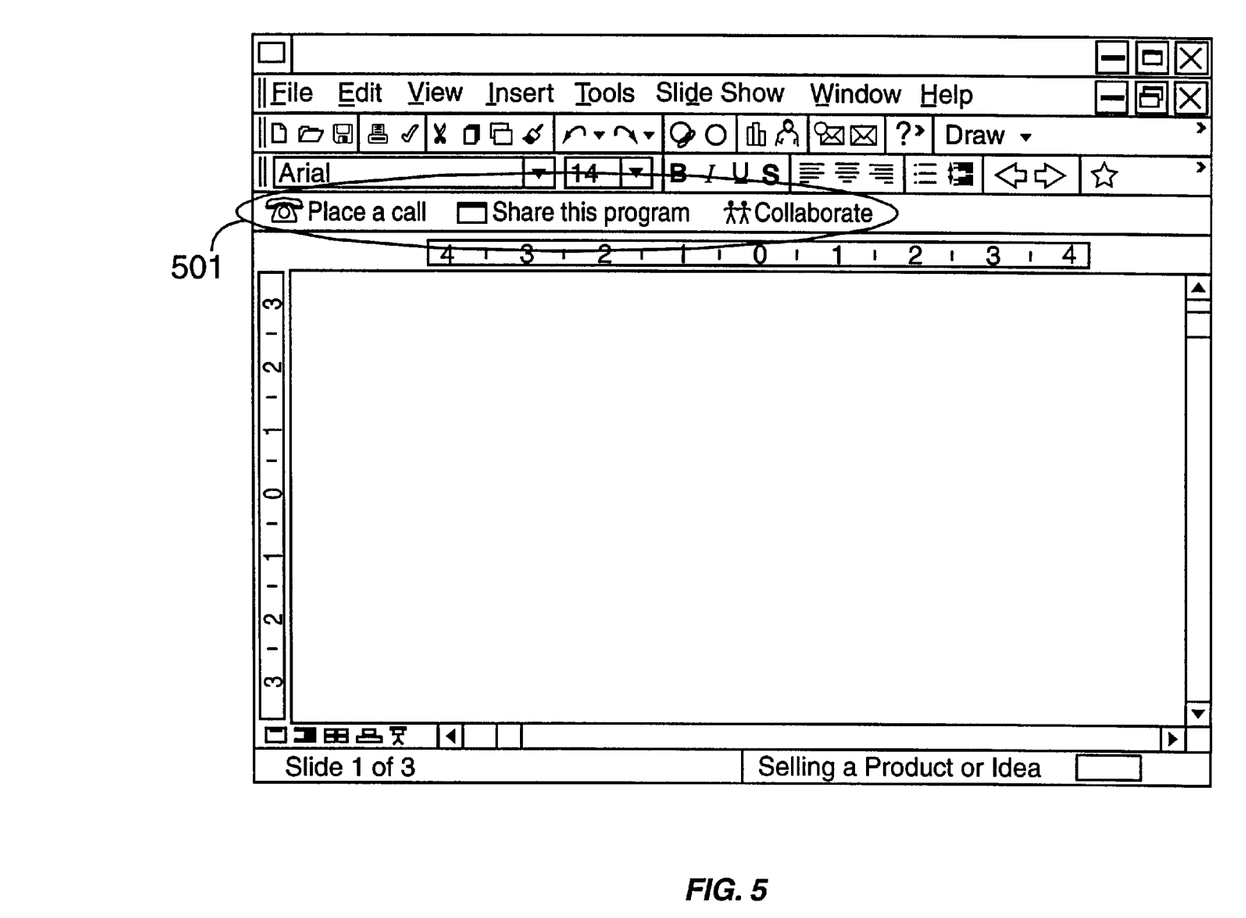
FIG. 5 is a screen display illustrating the graphical call status presentation system of the present invention in operation.

A key advantage of the present invention is that GUI elements are dynamically updated to reflect the current status of a communication session. The communication agent 104 monitors events from the voice agent and the data agent. When it receives an event it communicates the updated state to the state persistence agent 105, which updates the state of all appropriate GUI elements in all currently registered applications. These GUI elements are, in most cases, buttons with icons. For example, a telephone icon with the receiver hung up can change to a telephone icon with the receiver laying next to the telephone if a voice call is already in progress. Alternatively, a button to share an application can be dimmed when the function associated with the button cannot be initiated. FIG. 5 illustrates an application with a toolbar 501 containing GUI elements which are used by the present invention. The buttons labeled "Share this program" and "Collaborate" are dimmed indicating these functions are not currently available.

Figure 2:
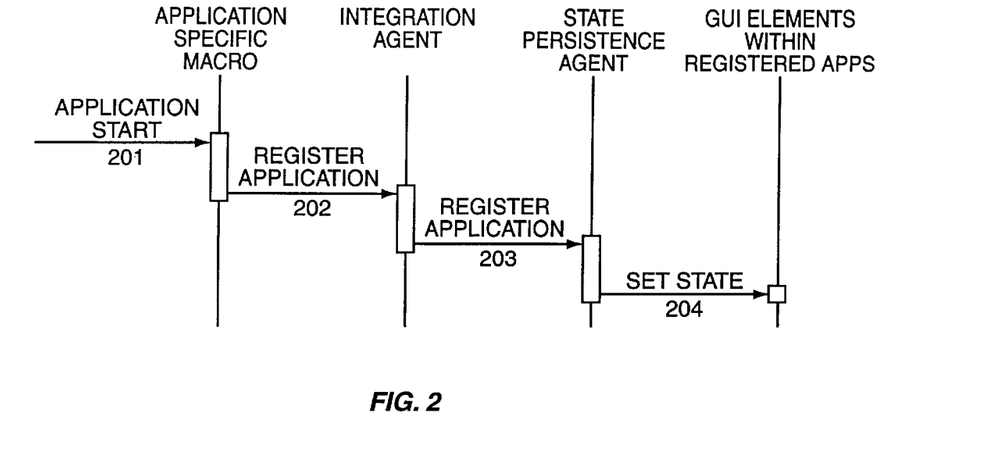
FIG. 2 is a software message flow diagram illustrating how a desktop application is registered with the state persistence agent of the present invention.

FIG. 2 illustrates the application registration messages which are transferred among the various software components which implement the invention. An application starts at 201. This application start is detected by an application-specific macro which seeks to register the application at 202 with the integration agent. The integration agent then registers the application with the state persistence agent at 203. The state persistence agent then sets the appropriate state for GUI elements within registered applications at 204.

Figure 3:
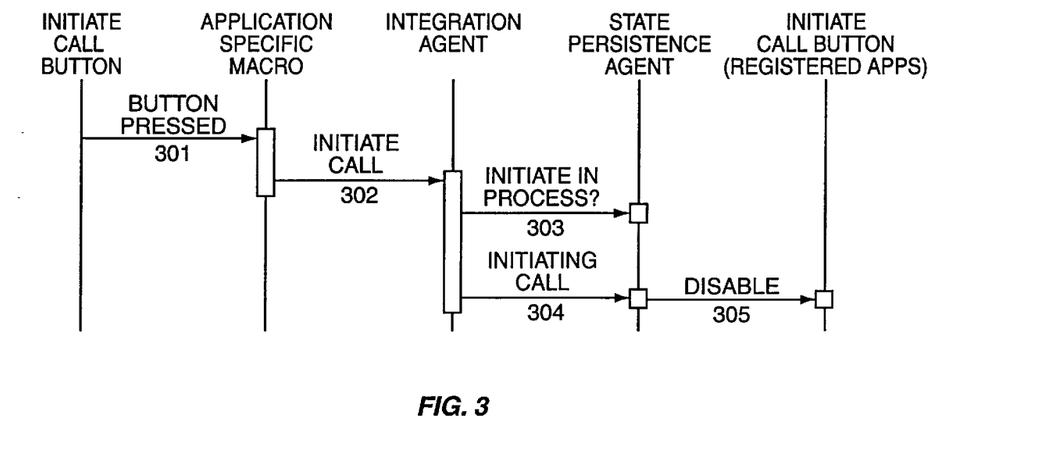
FIG. 3 is a software message flow diagram showing one example of how a button is updated in accordance with a change in status of a telecommunication session.

FIG. 3 illustrates the process of updating GUI elements in response to an action initiated by the user. In this example, the user presses an initiate call button. The button is pressed at 301 and the application-specific macro notifies the integration agent to initiate a call at 302. At 303, the integration agent checks with the state persistence agent to see if a call is already being initiated. Assuming the answer is no, the integration agent notifies the state persistence agent the call is being initiated at 304. The state persistence agent then disables the initiate call button to accurately reflect the status of call initiation.

Figure 4:
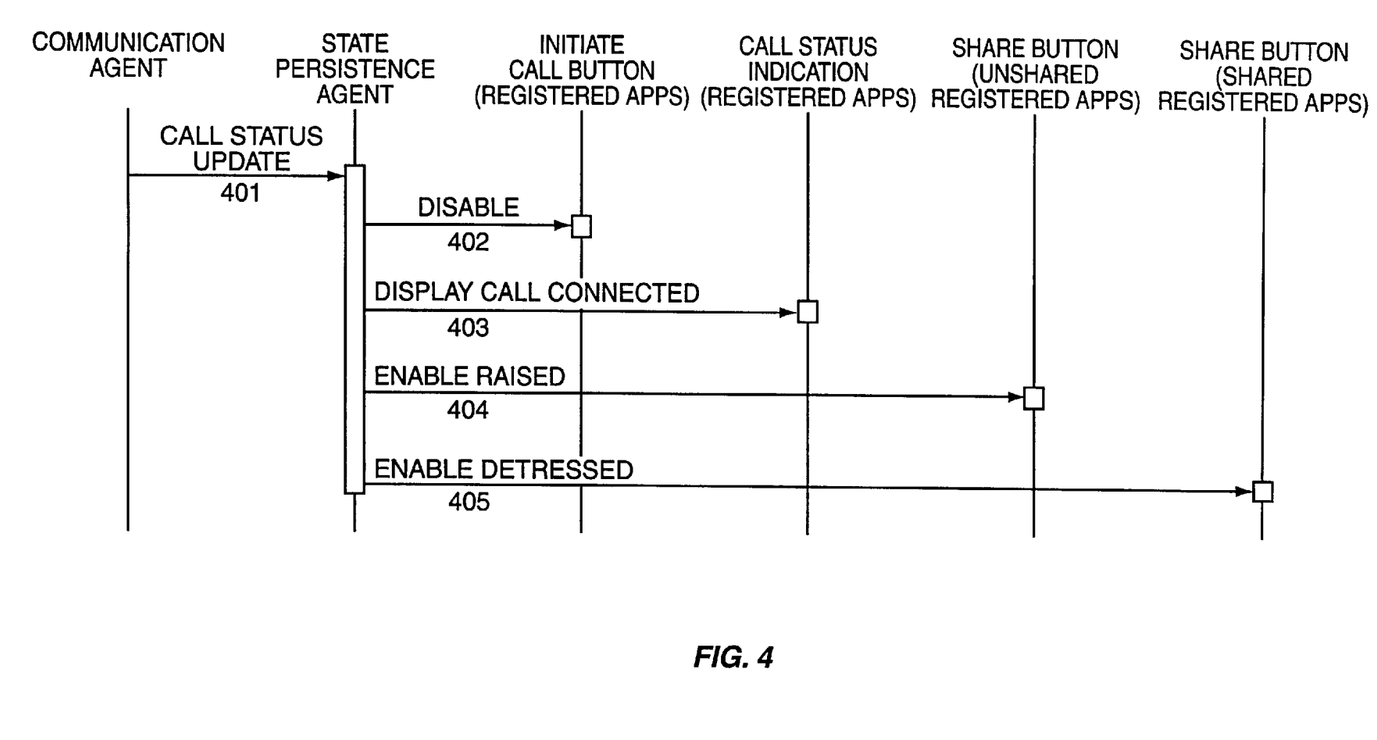
FIG. 4 is a more generalized software message flow diagram showing how graphical user interface elements of the present invention are updated in accordance with a change in status of a telecommunication session.

FIG. 4 is a more generalized example of a software message flow diagram which illustrates how multiple GUI elements can be updated in response to a notification that the status of a data call which is part of a communication session has changed. At 401 the communication agent notifies the state persistence agent that a call status update is required. In this example an initiate call button must be disabled. The state persistence agent disables this button at 402. The state persistence agent also updates a call status indication button at 403 and enables a share button at 404 to indicate that the data call can be used to share applications. Once sharing begins the state persistence agent changes the share button to a depressed state, indicating that the current application is being shared, at 405.

Figure 6:
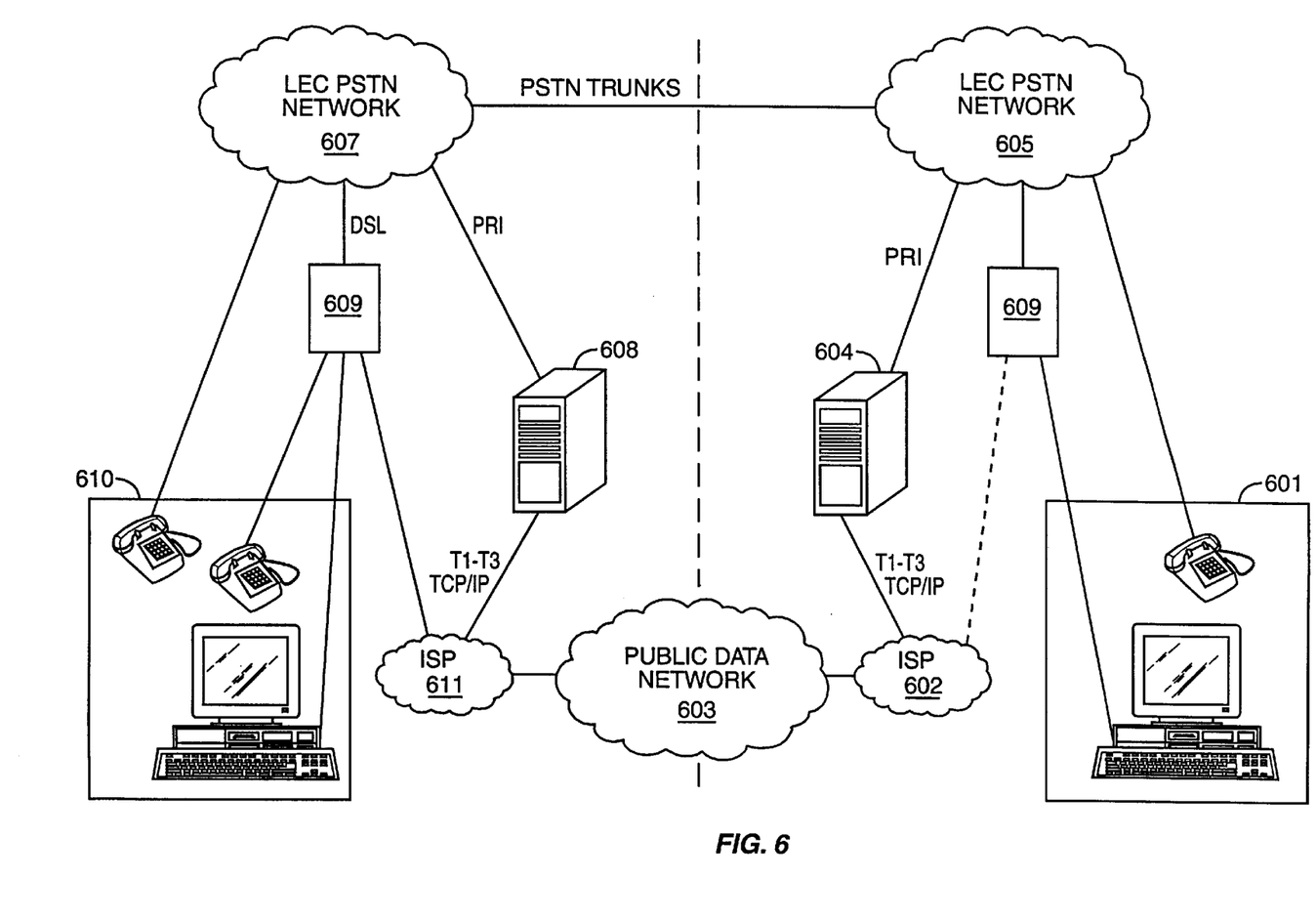
FIG. 6 is a network diagram illustrating one possible network environment in which the present invention might be used.

FIG. 6 illustrates one example of a network environment in which the present invention is used. On the right side of FIG. 6 is shown User 2, 601, whose telephone is interfaced directly to a public switched telephone network (PSTN) 605. Additionally User 2 has a personal computer workstation which is interfaced to both the PSTN and a point-of-presence 602 for an Internet service provider (ISP) via a conventional modem 606. The personal computer workstation contains the software which implements the present invention and displays the appropriate GUI elements. The CTServer 604 is connected between the PSTN and the ISP point-of-presence. In the preferred embodiment the server is connected to the PSTN via a primary rate interface (PRI), which is a well-known part of the integrated services digital network (ISDN) standard. The connection to the ISP point-of-presence is made via either a TI, T3, or TCP/IP interface.

The left side of FIG. 6 is similar to the right side. However, User 1, 610 shown on the left side of FIG. 6 is using a digital subscriber loop (DSL) to interface the desktop computer to the PSTN and the ISP. The digital subscriber loop can also be used to interface telephones into the networks. DSL modem 609 provides the interface point for both the desktop computer and a DSL telephone. The desktop computer used by User 1 includes the present invention. In addition User 1, 610, has available a conventional telephone that directly interfaces to PSTN 607. CTServer 608 works essentially the same as CTServer 604. According to FIG. 6, User 1 is served by one local exchange carrier (LEC), and User 2 is served by a different LEC. The two PSTN's are connected via PSTN trunks. Additionally, the two Internet service providers 602 and 611 are connected via the public data network 603. In the preferred embodiment the public data network is the Internet.

It should be noted that although FIG. 6 shows one example a network environment in which the invention can operate, there are many other alternatives. Indeed the public networks could be replaced by privately owned networks. Is also possible to omit the CTServer if a first party is supplying status information to the voice agent which is being used by the present invention.

Figure 7:
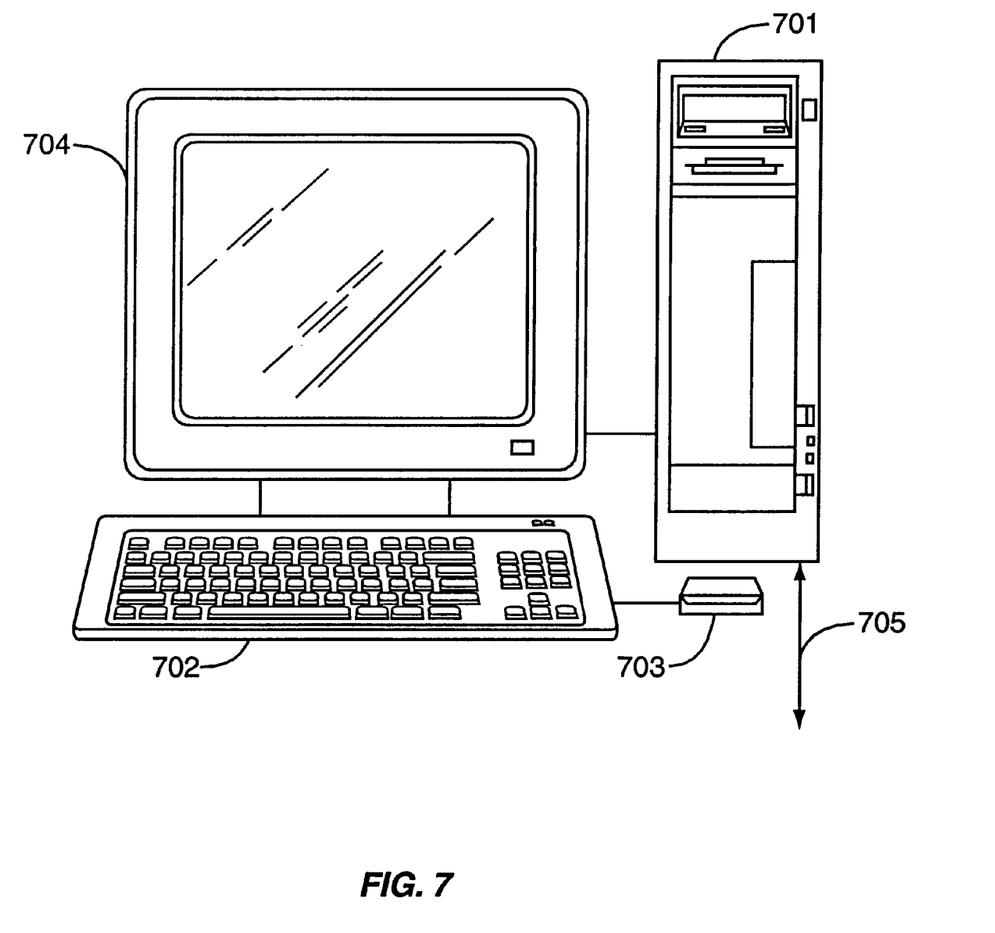
FIG. 7 illustrates a personal computer workstation in which the present invention might be used.

FIG. 7 illustrates a personal computer workstation on which the software which implements the present invention can be operated. Input output (I/O) devices such as keyboard 702, mouse 703, and display 704. The display is used to show an operator a computer desktop on which various information is displayed. Such information includes the GUI elements of the present invention. System unit 701 is connected to all of the I/O devices, and contains memory, media devices, and a central processing unit (CPU) all of which together execute the client software of the present invention and cause the various agents and software elements of the present invention to operate when the invention is in use. A network interface is normally implemented via an adapter card however for the sake of simplicity the shown graphically as interface 705.

Figure 8:
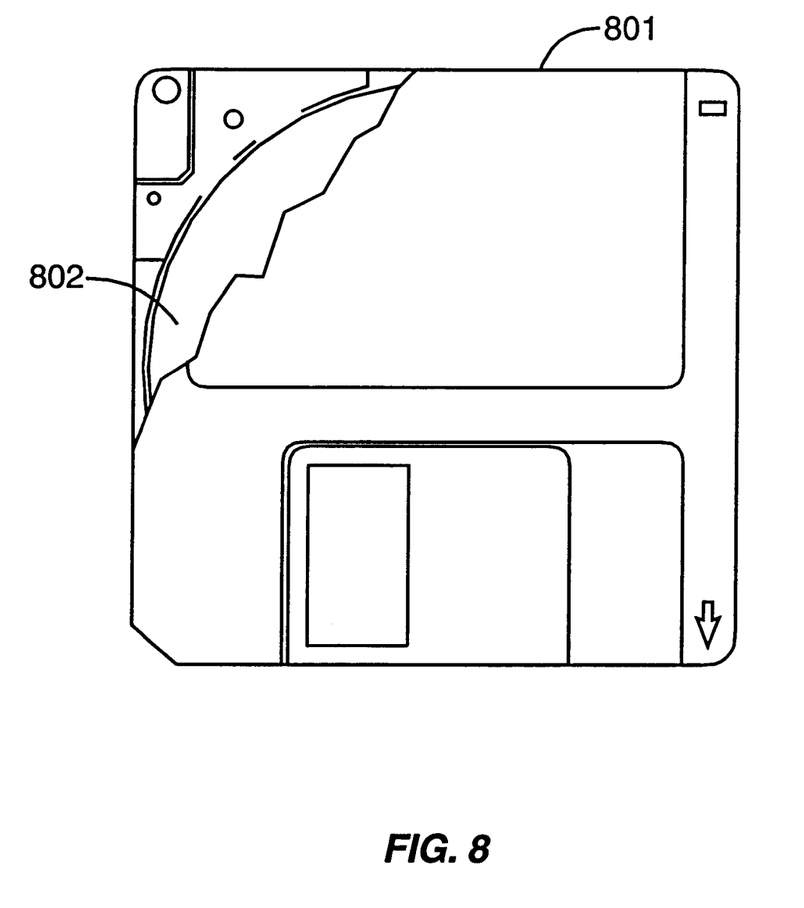
FIG. 8 illustrates a media on which computer program code which implements the present invention might be embodied.

As previously mentioned, appropriate computer program code in combination with appropriate hardware implements most of the elements of the present invention. This computer program code is often stored on storage media. This media can be a diskette, hard disk, CD-ROM, or tape. The media can also be a memory storage device or collection of memory storage devices such as read-only memory (ROM) or random access memory (RAM). Additionally, the computer code can be transferred to the workstation over the Internet or some other type of network. FIG. 8 illustrates one example of a media. FIG. 8 shows a diskette of the type where magnetic media 802 is enclosed in a protective jacket 801. Magnetic field changes over the surface of the magnetic media 802 are used to encode the computer program code. In this way the computer program code is stored for later retrieval.

We have described specific embodiments of our invention which provides graphical call status for a communication session which uses a desktop computer. One of ordinary skill in the networking and computing arts will quickly recognize that the invention has other applications in other environments. In fact, many embodiments and implementations are possible. The following claims are in no way intended to limit the scope of the invention to the specific embodiments described.

We claim:

1. A method of dynamically indicating a status of a communication session using computer system graphical user interface elements which are integrated into a separate desktop application, the method comprising the steps of:

executing an application-specific macro which registers the graphical user interface elements within the separate desktop application with a state persistence agent;

detecting a change in the status of the communication session;

changing the state of one or more graphical user interface elements within the separate desktop application in accordance with the change in the status of the communication session.

2. The method of claim 1 wherein the status of the communication session includes a status of a telephone which is associated with the communication session.

3. The method of claim 2 wherein status information is received from a third party call entity.

4. The method of claim 2 wherein status information is received from a first party call entity.

5. A method of dynamically indicating a status of a communication session the method comprising the steps of:

(a) integrating graphical user interface user elements into a separate operating system taskbar:

(b) detecting a change in the status of the communication session; and (c) changing the state of one or more graphical user interface elements in accordance with the change in the status of the communication session.

6. The method of claim 5 wherein the status of the communication session includes a status of a telephone which is associated with the communication session.

7. The method of claim 6 wherein status information is received from a third party call entity.

8. The method of claim 6 wherein status information is received from a first party call entity.

9. Apparatus for dynamically indicating a status of a communication session using computer system graphical user interface elements which are integrated into a separate desktop application, the apparatus comprising:

means for executing an application-specific macro which registers the graphical user interface elements within the separate desktop application with a state persistence agent;

means for detecting a change in the status of the communication session;

means for changing the state of one or more graphical user interface elements within the separate desktop application in accordance with the change in the state of the communication session.

10. Apparatus for dynamically indicating a status of the communication session using the apparatus comprising:

(a) graphical user interface elements integrated into a separate operating system taskbar;

(b) means for detecting a change in the status of the communication session; and (c) means for changing the state of one or more graphical user interface elements according to the change in the status of the communication session.

11. A computer program product for dynamically indicating a status of a communication session using computer system graphical user interface elements which are integrated into a separate desktop application, the computer program product having a medium with a computer program embodied thereon, the computer program comprising:

means for executing an application-specific macro which registers the graphical user interface elements within the separate desktop application with a state persistence agent;

computer program code for detecting a change in the status of the communication session;

computer program code for changing the state of one or more graphical user interface elements within the separate desktop application in accordance with the change in the status of the communication session.

12. The computer program product of claim 11 wherein the status of the communication session includes a status of the telephone which is associated with the communication session.

13. The computer program product of claim 12 wherein status information is received from a third party call entity.

14. The computer program product of claim 12 wherein status information is received from a first party call entity.

15. A computer program product for dynamically indicating the status of a communication session the computer program product having a median with a computer program body thereon, the computer program comprising;

(a) computer program code for integrating graphical user interface elements into a separate operating system taskbar:

(b) computer program code for detecting a change in the status of the communication session; and (c) computer program code for changing the state of one or more graphical user interface elements, in accordance with the change in the status of the communication session.

16. The computer program product of claim 15 wherein the status of the communication session includes a status of a telephone which is associated with the communication session.

17. The computer program product of claim 16 wherein status information is received from a third party call entity.

18. The computer program product of claim 16 wherein status information is received from a first party call entity.

19. Apparatus for graphical presentation of call status comprising:

a communications agent for monitoring and synchronizing data and voice communications;

a state persistence agent which processes requests to update graphical user interface elements, the state persistence agent connected to the communications agent;

an application-specific macro which registers the graphical user interface elements within a separate desktop application with a state persistence agent;

integration agent which processes user requests and monitors the communications agent, the integration agent connected to the application-specific macro, the communications agent, and the state persistence agent; and operating system taskbar graphical user interface elements connected to and controlled by the state persistence agent.

20. A computer program product for graphical presentation of call status, the computer program product having a medium with a computer program embodied thereon, the computer program comprising:

computer program code for establishing a communications agent for monitoring and synchronizing data and voice communications;

computer program code for establishing a state persistence agent which processes requests to update graphical user interface elements, the state persistence agent connected to the communications agent;

computer program code for establishing an application-specific macro which registers the graphical user interface elements within a separate desktop application with the state persistence agent;

computer program code for establishing an integration agent which processes user requests and monitors the communications agent, the integration agent connected to the application-specific macro, the communications agent, and the state persistence agent; and computer program code for creating operating system taskbar graphical user interface elements connected to and controlled by the state persistence agent.

21. A computer system having apparatus dynamically for indicating a status of the communication session the computer system comprising:

(a) graphical user interface elements integrated into a separate desktop application:

(b) a plurality of input output devices;

(c) a network connection; and (d) a system unit disposed between the plurality of input/output devices in the network connection, the system unit including means for executing an application-specific macro, means for detecting a change in the status of the communication session, and means for changing the state of one or more graphical user interface elements as registered by the application-specific macro and in accordance with the change in the status of the communication session.

22. A computer system having apparatus for dynamically indicating a status of a communication session the computer system comprising:

(a) graphical user inter face elements integrated into a separate operating system taskbar;

(b) a plurality of input/output devices;

(c) a network connection; and (d) a system unit disposed between the plurality of input/output devices and the network connection, the system unit including means for detecting a change in the status of the communication session, and means for changing the state of one or more graphical user interface elements, in accordance with the change in the state of the communication session.

23. A computer system comprising:

a plurality of input/output devices;

a network connection;

a system unit disposed between the plurality of input/output devices and the network connection, the system unit including a computer program for dynamically indicating a status of a communication session using computer system graphical user interface elements which are integrated into a separate desktop application, the computer program comprising computer program code for executing an application-specific macro, computer program code for detecting a change in the status of the communication session, and computer program code for changing the state of one or more graphical user interface elements as registered by the application-specific macro and according to the change of the status of the communication session.

24. The computer system of claim 23 wherein the status of the communication session includes a status of a telephone which is associated with the communication session.

25. The computer system of claim 24 wherein status information is received from a third party call entity.

26. The computer system of claim 24 wherein status information is received from a first party call entity.

27. A computer system comprising:

a plurality of input/output devices;

a network connection;

a system unit disposed between the plurality of input/output devices and the network connection, the system unit including a computer program for dynamically indicating a status of a communication session using computer system graphical user interface elements which are integrated into an operating system taskbar, the computer program comprising computer program code for detecting a change in the status of the communication session, and computer program code for changing the state of one or more graphical user interface elements in accordance with the change in status of the communication session.

28. The computer system of claim 27 wherein the status of the communication session includes a status of a telephone which is associated with the communication session.

29. The computer system of claim 28 wherein status information is received from a third party call entity.

30. The computer system of claim 28 wherein status information is received from a first party call entity.

* * * * *